United States Patent [19]

Hatch

[11] 4,263,629

[45] Apr. 21, 1981

[54] DISK FILE WITH SYMMETRICAL HOLLOW BASE

[75] Inventor: Michael R. Hatch, San Jose, Calif.

[73] Assignee: International Business Machines Corporation, Armonk, N.Y.

[21] Appl. No.: 20,904

[22] Filed: Mar. 16, 1979

Related U.S. Application Data

[63] Continuation of Ser. No. 838,346, Sep. 30, 1977, abandoned.

[51] Int. Cl.³ .................................................. G11B 17/02
[52] U.S. Cl. ......................................................... 360/98
[58] Field of Search ............................................. 360/98

[56] References Cited

U.S. PATENT DOCUMENTS 4,062,049  12/1977  Dirks ....................................... 360/98

Primary Examiner—Robert S. Tupper
Attorney, Agent, or Firm—Henry E. Otto, Jr.

[57] ABSTRACT

A disk file wherein the actuator(s) for the magnetic head(s) are mounted within and supported by a hollow symmetrical generally ring-shaped base as closely as possible to a neutral plane that divides opposing walls of the base into substantially symmetrical parts. The disk stack is supported with its spindle normal to the neutral plane and its center of gravity substantially coincident with said plane. This substantially eliminates bending of the base out of the plane of the disks resultant from temperature gradients and from reaction forces set up when the voice coil motor actuator moves the head(s).

13 Claims, 5 Drawing Figures

DISK FILE WITH SYMMETRICAL HOLLOW BASE

This is a continuation of application Ser. No. 838,346 filed 9/30/77, and now abandoned.

RELATED PATENT APPLICATIONS ASSIGNED TO THE SAME ASSIGNEE

Hatch, Ser. No. 838,345, filed Sept. 30, 1977, entitled "Damping Vibrations in Voice Coil Actuator", now U.S. Pat. No. 4,144,466.

BACKGROUND OF THE INVENTION

1. Field of the Invention

This invention relates primarily to disk file apparatus of the accessing head type, wherein a magnetic read/write head is movable radially of a recording surface of a rotating magnetic disk for reading or recording data in digital form at selectable radial locations or tracks. The invention relates more particularly to such an apparatus wherein a hollow base is provided and so configured, and a disk/spindle/housing assembly and voice coil motor (VCM) are so mounted therein and thereto, that during VCM operation, bending moments in the base are substantially eliminated and a substantially uniform temperature differential is maintained between the interior and exterior surfaces of the base.

In disk files of the accessing head type, the disks have traditionally been supported on a vertical spindle projecting upwardly from a flat horizontal baseplate; and a carrier/arm assembly has been movable horizontally on the baseplate in response to energization of the coil of a VCM actuator to carry magnetic heads into transducing engagement with a selected track of a particular disk. Reaction to this movement of the heads by the actuator sets up bending moments in the baseplate because the neutral axis of the flat baseplate is below the force center of the VCM and the mass centers of the VCM and of the disk stack. These bending moments can cause dynamic bending of the spindle and track misregistration error. Moreover, since there is a temperature differential between the upper and lower surfaces of the baseplate, the resultant thermal expansion causes static out-of-plane bending of the baseplate.

To reduce this bending, it has been proposed in U.S. Pat. No. 3,768,083 to provide two flat overlying baseplate sections. One is made very rigid and supports the disk pack, magnetic heads, head support and spindle; and the other supports the heavy pole pieces of the VCM. However, there is still out-of-plane bending because the center of force of the VCM and the centers of gravity of the VCM and disks are placed a significant distance from the neutral plane of the baseplate; and distortion still occurs due to the difference in temperature between the upper and lower surfaces of the baseplate.

These problems are substantially eliminated in the disk file embodying the present invention, wherein each VCM actuator is mounted within and supported by a hollow generally ring-shaped symmetrical base as closely as possible to a neutral plane that divides opposing walls of the base into two substantially symmetrical parts; and the disk/spindle/housing assembly is independently secured to the base with its spindle normal to the neutral plane and its center of gravity substantially coincident therewith.

This improved configuration is not disclosed or suggested by the most pertinent prior art known to applicant and to those substantively involved in the preparation of this application. U.S. Pat. No. 4,005,490 shows a cylindrical frame and bridge plates for supporting centrally a disk, spindle and motor in a symmetrical arrangement; however, the motor comprises a rotor surrounding a stator, and only fixed heads are employed, and there is no VCM or equivalent translationally movable actuator mounted as herein described for controlling the heads.

A disk file apparatus marketed by Data Products Corporation has plural access mechanisms mounted on the exterior of a cast metal shroud surrounding disk stack. However, the shroud apparently does not support the disk stack and spindle, which appear to be supported from beneath. Hence, the shroud does not function as a base.

U.S. Pat. No. 4,008,492 discloses a magnetic disk memory device wherein a disk pack is enclosed in a shroud. The shroud has a chamber to which air is supplied to cool the disks to reduce the temperature gradient between components within the chamber. However, this arrangement does not propose a solution to the dynamic out-of-plane bending problem with which applicant is also concerned. The disk file apparatus according to the present invention substantially eliminates both dynamic and static out-of-plane bending of the base.

SUMMARY OF THE INVENTION

The disk file apparatus embodying the present invention comprises a substantially symmetrical hollow generally ring-shaped base divided into two substantially identical parts by a neutral plane that passes through opposing symmetrical walls thereof. A disk/spindle/housing assembly is inserted axially within the hollow and mounted to the base so its center of gravity lies substantially in said plane. The assembly carries the coil of at least one voice coil motor (VCM), the pole pieces of which are moved axially of the coil, then secured to brackets on the base within the hollow. If two VCMs are used, they are arranged at diametrically opposite sides of the disk. The center of force of each VCM is as close as possible to said plane to substantially eliminate bending moments on the base during VCM actuation of the heads. The ring base configuration maintains a substantially uniform temperature differential between the interior and exterior surfaces of the base. The disks are mounted with their planes vertical and parallel to the neutral plane so that the significant temperature gradient will occur parallel to the planes of the disks.

PRELIMINARY DESCRIPTION—FIGS. 1, 2 AND 3

Figure 1:
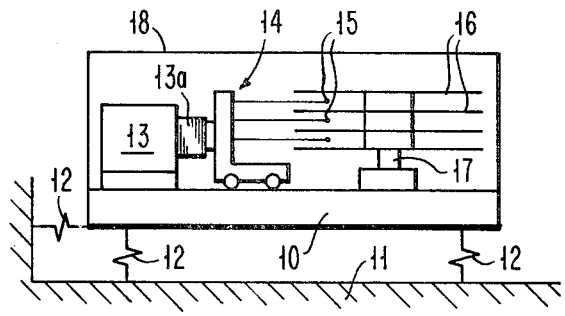
FIGS. 1, 2 and 3 are schematic diagrams of a disk file apparatus constructed in accordance with the teachings of the prior art.

These figures schematically depict a prior art-type disk file apparatus which comprises a baseplate 10 connected to a machine frame 11 through shock mounts, idealized as springs 12. Baseplate 10 has secured to its upper surface a voice coil motor (VCM) 13. VCM 13 comprises a voice coil 13a that is connected to a carriage/arm assembly 14. Assembly 14 is movable translationally to carry magnetic heads 15 into accessing transducing relation with a selected concentric track on a particular one of a plurality of coaxially arranged magnetic disks 16. The pack of disks is rotatably mounted adjacent one end of a spindle 17. The spindle is supported adjacent its opposite end in bearings (not shown) carried by baseplate 10.

Figure 2:
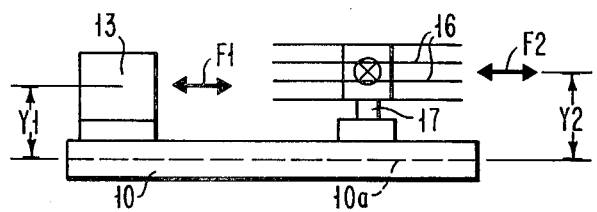
Figure 3:
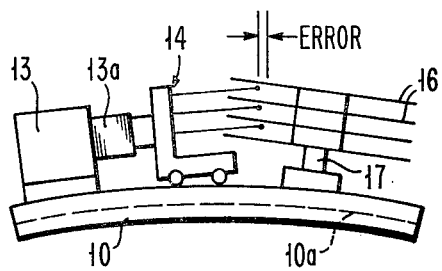

As the carriage/arm assembly 14 seeks to different tracks, reaction forces F1 (FIG. 2) are created by and at the VCM 13. Since the neutral axis 10a of baseplate 10 is below the point of application of force F1 by a distance Y1, a bending moment of magnitude F1Y1 is applied to the baseplate. Other bending moments are applied to baseplate 10 whenever it accelerates in the radial direction due to the mass centers of VCM 13 and the disk/spindle assembly 16,17 being above the neutral axis 10a. A force F2 acting at a distance Y2 from the neutral axis 10a produces a moment F2Y2 on the baseplate 10. If the appropriate seek length and delay between seeks is obtained so that there is significant force applied to VCM 13 at the natural frequency of baseplate 10, then out-of-plane bending such as depicted in FIG. 3 will occur. This will cause the carriage/arm assembly 14 to tilt relative to disks 16, resulting in off-track error between the heads 15 and disks. As earlier noted, a prior art approach to reducing this error is to make the baseplate 10 stiffer by increasing its thickness. However, this approach is inefficient because it increases the weight and cost of the baseplate.

Another problem associated with disk file apparatus of this prior art type is static out-of-plane bending due to temperature gradients between the upper and lower surfaces of baseplate 10. Bending of this type causes thermal off-track errors because of the uneven heating and thermal distortion of the baseplate. More specifically, the spinning disks 16 and voice coil 13a are major heat sources. They raise the temperature inside the disk stack cover 18 above that of the ambient air, thus heating the upper surface of the baseplate 10. Because of the large amount of turbulence inside the cover, the temperature difference between any two points within the cover is small relative to the temperature differential between the ambient air and air within the cover. The bottom surface of the baseplate is typically exposed to atmosphere or to the heating of power supplies, etc., which lie below it in machine frame 11. The resultant vertical temperature gradient across baseplate 10 causes it to bend out of the plane of the disks 16, similar to the distortion shown in FIG. 3, thus resulting in off-track error.

The bending problems just described are substantially eliminated in the disk file apparatus embodying the present invention and now to be described.

DESCRIPTION OF PREFERRED EMBODIMENT—FIGS. 4 AND 5

Figure 4:
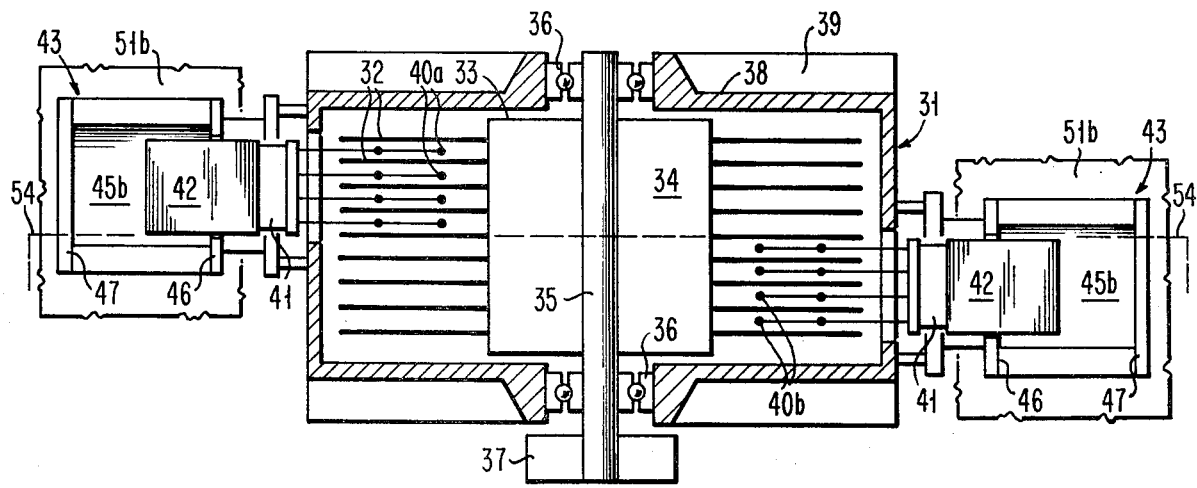
FIG. 4 is a top schematic sectional view of a disk file apparatus embodying the invention.

As illustrated schematically in FIG. 4, the disk file apparatus embodying the invention comprises a disk/spindle/housing assembly 31 including a plurality of parallel disks 32 coaxially arranged in a stack 33. These disks have on their opposite planar surfaces a magnetic material on which digital data is recordable magnetically. The disks of stack 33 are secured to a hub 34 that is keyed to a spindle 35 suitably supported in axially spaced bearings 36 and driven from an external source (not shown) by a pulley 37 outboard of the bearings. Encircling disk stacks 33 is a housing 38 comprising a plurality of circumferentially spaced radially extending stiffening ribs 39.

Two sets a,b of magnetic heads 40 are provided, each for reading or writing magnetic indicia on a corresponding axially spaced group of the disks 32. Each set of heads is movable translationally by a respective carriage/arm assembly 41 that carries a selected one of the heads into transducing engagement with a selected track on a particular disk 32. The carriage/arm assemblies 41 are preferably of the type described in the aforementioned related patent application. These assemblies 41 are disposed at diametrically opposite sides of the disk stack 33 and supported by, and movable translationally relative to, disk/spindle/housing assembly 31. Connected to the end of each carriage/arm assembly 41 remote from the heads is an electrically conductive coil 42 of a corresponding linear actuator device, preferably a voice coil motor (VCM) 43.

Figure 5:
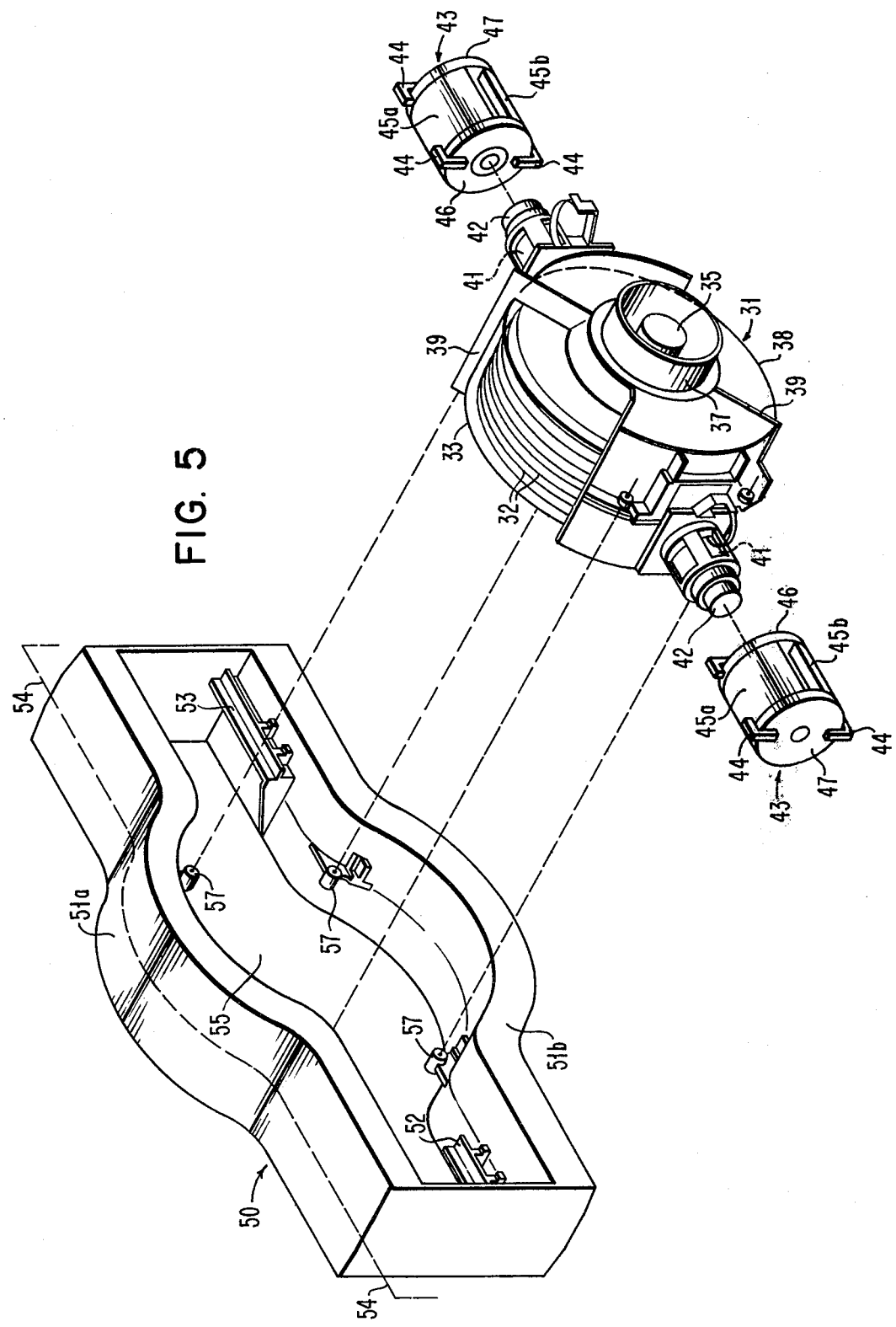
FIG. 5 constitutes an exploded perspective view of the file apparatus embodiment of FIG. 4.

Referring now to FIG. 5A, each VCM 43 comprises a stationary portion 44 including a pair of electromagnets 45a,b secured in circumferentially spaced relation to a front pole piece 46 and a central pole piece (not shown) formed integrally with a circular rear plate 47. These pole pieces are radially separated by an annular air gap (not shown). Axial movement of the corresponding coil 42, carriage/arm assembly 41 and heads 40a or b is initiated in conventional fashion by passing current through a selected one of the coils.

Referring now to FIG. 5B, the disk file apparatus also comprises a substantially symmetrical ring-shaped base 50. The base preferably is an integral casting that comprises upper and lower housing portions 51a,b that include opposing ring or segment-shaped annular portions; and the outer ends of each annular portion terminate in aligned straight portions. The straight portions of the upper portion 51a are parallel to and spaced from and at their outer ends joined to those of lower portion 51b. Each housing portion 51a,b provides a pair of brackets 52, 53 (only one set shown).

According to important features of the invention, and as illustrated in FIGS. 5A,B, base 50 is divided into substantially identical halves by an imaginary neutral plane 54 that passes vertically through the opposing walls of upper and lower housings 51a,b. The disk/spindle/housing assembly 31, carriage/arm assemblies 41, and coils 42 of VCMs 43 are moved as a unit in the direction of the spindle axis into a hollow enclosure or cavity 56 defined between the upper and lower base portions 51a,b. The disk/spindle/housing assembly 31 is then connected, as by bolts, directly to pairs of bosses 57 in the upper and lower housings 51a,b, respectively. The stationary portions 44 of each VCM 43 are now moved into cavity 56 in a direction generally parallel to the axis of spindle 35 until outboard the corresponding coil 42; whereupon they are moved inwardly toward the spindle axis in partially overlying concentric relation to the respective coil and bolted to the appropriate bracket 52 or 53. The stationary portions 44 of the two VCMs are then bolted directly to the brackets 52, 53, respectively. The assemblage 31, 41, 42, 44 is centered within cavity 56 (i.e., equidistant from the inner walls of housings 51a,b), the respective stationary portions 44 being disposed between the parallel straight portions of said housings.

The bosses 57 are so located axially in base 50 that the center of gravity of disk/spindle/housing assembly 31, including the structure 41, 42 associated therewith, is substantially coincident with the neutral plane. Likewise, the brackets 52, 53 are so located that the center of force of the stationary portion 44 of each VCM 43 is as close as possible, and preferably coincident with, neutral plane 54.

It will be understood that where only one VCM is used, or where two VCMs are used to control heads that access alternate or the same disks, it is readily possible for the center of force of each VCM 43 to lie in the neutral plane 54. However, if, as in the embodiment illustrated, two VCMs 43 are used to control accessing of different axially spaced sets of heads 40a,b, the centers of force of the VCMs may have to be offset slightly from the neutral plane; but, in such event, the centers of force should be offset equal minimal distances from the neutral plane.

The entire disk/spindle/housing assembly must have its center of gravity located at the neutral plane of ring base 50 to prevent inertial forces resultant from in-plane acceleration of the base from creating bending moments and exciting out-of-plane bending modes of the type earlier described in connection with FIGS. 1-3. Since the VCM reaction forces act either at or close to the neutral plane 54 and the inertial forces of the disk/spindle/housing assembly act through the neutral plane, dynamic out-of-plane bending is substantially eliminated.

Static out-of-plane bending due to temperature gradients is also substantially eliminated in the disk file apparatus embodying the invention. It will be noted that the axis of spindle 35 is horizontal, so that the planes of the disks are vertical. The significant temperature gradient thus occurs parallel to the planes of the disks (not out of plane as with the prior art configuration depicted in FIGS. 1-3). Since the disk/spindle/housing assembly 31 is centered within cavity 56 of the substantially symmetrical base 50, and the walls of housing portions 51a,b above and below said assembly are of uniform thickness, a substantially uniform temperature differential exists between the cavity and the ambient air outside the base. The axial ends of base 50 are enclosed by covers of plastic or light gauge metal. These covers are of such insignificant stiffness relative to that of the base that the temperature gradients across them do not cause the ring base to bend out of plane.

In summary, in the improved disk file apparatus embodying the invention, dynamic bending of the base out of the plane of the disks due to voice coil motor reaction forces and static bending of the base out of the plane of the disks due to temperature gradients are substantially eliminated. This excludes a major cause of off-track errors, thereby enabling a reduction in allowable track-to-track spacing in the respective disks. In addition, field replacement of the disk/spindle/housing assembly 31 is facilitated, since the assembly 31 and its associated movable structure 42, 41, 40 can be removed axially as a unit after the relatively heavy stationary portions 44 of the VCMs 43 are removed by withdrawal in diametrically opposed directions.

While the invention has been particularly shown and described with reference to a preferred embodiment thereof, it will be understood by those skilled in the art that various changes in form and detail may be made therein without departing from the spirit, scope and teaching of the invention. Accordingly, the apparatus herein disclosed is to be considered merely as illustrative, and the invention is to be limited only as specified in the claims.

What is claimed is:

1. A subassembly for a disk file storage apparatus comprising, in combination:

a base formed of opposing housing portions which are substantially symmetrical with respect to an axis of symmetry and provide a symmetrical cavity therebetween, said housing portions being bisected by an imaginary neutral plane that passes at right angles through said axis at a point dividing the base into two essentially identical halves;

a disk/spindle/housing assembly including a plurality of magnetic disks disposed within a housing and rotatably driven by a spindle from externally of the housing;

means for mounting said assembly within said cavity and to said base such that the center of gravity of said assembly is substantially coincident with said neutral plane and the axis of symmetry and axis of said spindle are coincident and normal to said plane and substantially centered between said opposing housing portions;

two sets of magnetic heads;

two electromagnetically controlled actuator devices, each comprising a stationary magnet structure and a movable portion, one such movable portion associated with each set of heads for moving the latter in directions parallel to said plane for transducing engagement with corresponding ones of said disks;

means supporting said movable portions on the housing of said assembly in substantially diametrically opposed relation outboard of said disks for movement radially thereof; and means securing said magnet structures to said base, and within said cavity in substantially diametrically opposed relation, such that their centers of force substantially coincide with said neutral plane to substantially eliminate any bending moments on the base resultant from translational movement of said movable portions.

2. A subassembly for a disk file storage apparatus comprising, in combination:

a base formed of opposing housing portions which are substantially symmetrical with respect to an axis of symmetry and provide a symmetrical cavity therebetween, said housing portions being bisected by an imaginary neutral plane that passes at right angles through said axis at a point dividing the base into two essentially identical halves;

a disk/spindle/housing assembly including a plurality of magnetic disks disposed within a housing and rotatably driven by a spindle from externally of the housing:

means for mounting said assembly within said cavity and to said base such that the center of gravity of said assembly is substantially coincident with said neutral plane and the axis of symmetry and axis of said spindle are normal to said plane and substantially centered between said opposing housing portions;

two electromagnetically controlled actuator devices, each comprising a stationary magnet structure and a movable portion;

means supporting said movable portions in substantially diametrically opposed relation on the housing of said assembly for slidable movement radially thereof;

two sets of magnetic heads, each set being movable by a movable portion of a respective one of said actuator devices in directions parallel to said plane for transducing engagement with said disks, the heads of one set being offset relative to those of the other set at substantially equal minimal distances at opposite sides of said plane so as to engage respective sets of said disks that are correspondingly offset along the axis of said spindle; and means securing said magnet structures to said base and within said cavity in substantially diametrically opposed relation and with their centers of force offset respectively said equal minimal distances at opposite sides of said neutral plane to minimize bending moments on the base resultant from translational movement of said movable portions.

3. A subassembly for a disk file storage device comprising, in combination:

a base member;

a disk/housing assembly (DHA);

a pair of actuators each of which includes a stationary magnet structure and a coil movable relative to said magnet structure;

said DHA comprising two sets of coaxially aligned magnetic disks, a shaft mounting each disk for rotation about a common axis, a pair of movable carriages, each carriage being associated with a respective one of the sets of disks, at least one transducer connected to each carriage for movement thereby into transducing engagement with at least one disk of the corresponding set, means for attaching each coil to a respective one of said carriages, and housing means mounting said shaft and said carriages so that said carriages move radially relative to said axis, said housing means being bisected by an imaginary neutral plane transversely of said axis into two essentially identical halves;

means for removably attaching said housing means to said base member;

said base member having one portion providing a bore-like opening for receiving the DHA and other portions each extending radially therefrom;

means for mounting said stationary magnet structures to said base member in substantially diametrically opposed relation relative to said DHA but offset axially along said shaft equal minimal distances to either side of said neutral plane and in cooperative relationship with respective ones of said coils; and means mounting said DHA to said base member to permit said coils to cooperate with said magnet structures to control movement of said carriages and thereby of said transducers.

4. A subassembly according to claim 3, wherein the first-mentioned mounting means mounts said stationary magnet structures to said base member in such manner that said structures can be moved outwardly in a generally radial direction relative to said DHA for replacement of said DHA.

5. A subassembly for a disk file storage device comprising, in combination:

a substantially symmetrical base member comprising two symmetrical housings of similar thickness and composition that include opposing segment-shaped annular portions providing a cavity including a generally bore-like opening and at least one other portion extending radially therefrom;

a disk/housing assembly (DHA);

at least one actuator which includes a stationary magnet structure and a coil movable relative to said magnet structure;

said DHA comprising at least one magnetic disk, a shaft mounting each disk for rotation about a horizontal axis, a movable carriage, at least one transducer connected to said carriage for movement thereby into transducing engagement with a corresponding disk, means for attaching said coil to said carriage, and housing means mounting said shaft and said carriage so that said carriage moves radially relative to said axis;

means for removably attaching said housing means of said DHA to said housing of said base member within said opening;

means for mounting said stationary magnet structure to said base member within said other cavity portion in substantially radial relation to said DHA and axis and in cooperative relationship with said coil; and means mounting said DHA to said base member to permit said coil to cooperate with said magnet structure whereby static out-of-plane bending due to temperature gradients is substantially eliminated because the symmetrical housings are of the same thickness and the significant temperature gradient occurs parallel to the plane of each disk.

6. A subassembly according to claim 5, wherein the first-mentioned mounting means mounts said stationary magnet structure to said base member in such manner that said structure can be moved outwardly in a generally radial direction relative to said DHA for replacement of said DHA.

7. A subassembly for a disk file storage apparatus comprising, in combination:

a base member having an axis of symmetry and a cavity including a bore-like opening therethrough having its axis coincident with said axis of symmetry, said base member being of substantially identical configuration and mass at opposite sides of a bisecting plane that is normal to said axis of symmetry and passes substantially through the center of gravity of said base member;

a disk/housing assembly (DHA) comprising a plurality of magnetic disks rotatably disposed within a housing and mounted within said cavity such that the axis of rotation of said disks is coincident with said axis of symmetry and said DHA is substantially centered within said cavity and the center of gravity of said DHA is disposed substantially coincident with said plane;

two sets of transducers for transducing engagement with respective ones of said disks; and a pair of voice coil motors (VCMs), each VCM including a stationary magnet structure of heavy mass and a relatively light electrically conductive coil movable axially relative to its associated stationary magnet structure, means operatively connecting each coil to a corresponding set of said transducers, and means supporting each coil on said DHA for limited radial movement relative thereto, and means mounting said stationary magnet structure to said base member at substantially diametrically opposite sides of said DHA, the center of force of each VCM lying substantially in said plane, thereby to substantially eliminate any bending moments on said base member during axial movement of each such coil.

8. A subassembly according to claim 7 characterized in that said DHA and each VCM are mounted in such manner that the stationary magnet structure of each VCM are removable in a direction parallel to said plane, and said DHA and electrically conductive coil are thereafter removable in unison in a direction generally normal to said plane.

9. A subassembly according to claim 7, wherein said axis of symmetry is horizontal, such that the planes of the disks are vertical and parallel to said bisecting plane, to cause the significant temperature gradient to occur parallel to the planes of the disks.

10. A subassembly according to claim 7, wherein said base member has walls of substantially uniform thickness so as to maintain a substantially uniform temperature differential between the cavity and exterior of said base member.

11. A method of making and assembling a subassembly for a disk file storage device comprising the steps of:
moving a disk/housing assembly (DHA) and associated coil of at least one voice coil motor (VCM) into a cavity centrally disposed within a substantially symmetrical base member in a direction generally parallel to the axis of symmetry of the base member;
mounting said DHA within the cavity and to said base member such that the axis of the DHA coincides with said axis of symmetry and the center of gravity of the DHA is disposed along said axis of symmetry at substantially the midpoint between opposite ends of said base member;
moving the stationary magnet structure of each VCM into the cavity successively in a direction substantially parallel to said axis of symmetry and then in a direction substantially normal to said axis of symmetry; and
mounting the stationary magnet structure of each VCM to said base member at substantially said midpoint thereof and coaxially with each respective coil.

12. A subassembly for a disk file storage device comprising, in combination:
a substantially symmetrical base member comprising opposing annular housing portions of substantially identical thickness and composition which are substantially symmetrical with respect to an axis of symmetry and provide a substantially symmetrical cavity therebetween,
at least one voice coil motor (VCM), each comprising a stationary magnet structure and a coil movably associated therewith,
a disk/housing/assembly (DHA),
means mounting said DHA within the cavity and to said base member such that the axis of the DHA coincides with the axis of symmetry of said housing portions, and the center of gravity of the DHA is disposed along said axis of symmetry at substantially the midpoint between opposite ends of said housing portions; and
means mounting the stationary magnet structure of each VCM within the cavity at substantially said midpoint of the housing portions and coaxially with each respective coil.

13. A subassembly for a disk file storage device comprising in combination:
a base comprising opposing housing portions of substantially identical thickness and composition which are substantially symmetrical with respect to an axis of symmetry and provide a substantially symmetrical cavity therebetween;
a disk/spindle/housing assembly (DHA) including a plurality of rotatably driven magnetic disks;
means for mounting said DHA within said cavity and to said base such that the axis of the DHA coincides with the axis of symmetry and the center of gravity of the DHA is disposed along said axis at substantially the midpoint between the opposite axial ends said housing portions; and
two electromagnetically controlled actuator devices, each comprising a stationary magnet structure and a portion movable relative thereto,
said movable portions being supported by said DHA in substantially diametrically opposed relation but offset equal minimal distances along said axis of symmetry to either side of said midpoint for movement radially of the disks for controlling transducing engagement with different disk surfaces, and
said stationary magnet structures being mounted to said base such that their centers of force are substantially aligned with said midpoint to substantially eliminate any bending moments on the base resultant from translational movement of said movable portions.

* * * * *